United States Patent
Ohnishi et al.

(10) Patent No.: US 11,970,172 B2
(45) Date of Patent: Apr. 30, 2024

(54) INFORMATION PROCESSING METHOD AND INFORMATION PROCESSING SYSTEM

(71) Applicant: Panasonic Intellectual Property Corporation of America, Torrance, CA (US)

(72) Inventors: Ryota Ohnishi, Hyogo (JP); Hiroaki Urabe, Osaka (JP)

(73) Assignee: PANASONIC INTELLECTUAL PROPERTY CORPORATION OF AMERICA, Torrance, CA (US)

( * ) Notice: Subject to any disclaimer, the term of this patent is extended or adjusted under 35 U.S.C. 154(b) by 413 days.

(21) Appl. No.: 17/336,907

(22) Filed: Jun. 2, 2021

(65) Prior Publication Data
US 2021/0284173 A1 Sep. 16, 2021

Related U.S. Application Data

(63) Continuation of application No. PCT/JP2020/011663, filed on Mar. 17, 2020.
(Continued)

(30) Foreign Application Priority Data

Nov. 28, 2019 (JP) ................................. 2019-215353

(51) Int. Cl.
*B60W 40/08* (2012.01)
*B60W 50/14* (2020.01)
(Continued)

(52) U.S. Cl.
CPC ............ *B60W 40/08* (2013.01); *B60W 50/14* (2013.01); *B60W 60/00253* (2020.02);
(Continued)

(58) Field of Classification Search
CPC ................ B60W 40/08; B60W 50/14; B60W 60/00253; B60W 60/0059;
(Continued)

(56) References Cited

U.S. PATENT DOCUMENTS 9,946,531 B1 * 4/2018 Fields ...................... G07C 5/02
10,156,848 B1 * 12/2018 Konrardy .............. B60W 10/20
(Continued)

FOREIGN PATENT DOCUMENTS

| JP | 2003-99891 | 4/2003 |
|----|------------|--------|
| WO | 2018/070440 | 4/2018 |
| WO | 2018/074586 | 4/2018 |

OTHER PUBLICATIONS

International Search Report (ISR) dated Jun. 9, 2020 in International (PCT) Application No. PCT/JP2020/011663.

*Primary Examiner* — Mussa A Shaawat
(74) *Attorney, Agent, or Firm* — WENDEROTH, LIND & PONACK, L.L.P.

(57) ABSTRACT

An information processing method to be executed by a computer includes: obtaining a driving skill of a person who rides an autonomous vehicle, which represents at least one of whether the person can drive a manually-drivable autonomous vehicle or a level at which the person can drive; obtaining specifications of autonomous vehicles about autonomous driving; obtaining a route for transporting the person; determining deviation risks, each of which includes at least one of a possibility of deviation of an autonomous driving system including a corresponding one of the autonomous vehicles from an operational design domain or a degree of the deviation, based on the specifications and the route; selecting an autonomous vehicle assigned to transportation of the person from the autonomous vehicles according to each of the deviation risks and the driving skill;
(Continued)

and sending a notification of the selected autonomous vehicle.

13 Claims, 7 Drawing Sheets

Related U.S. Application Data

(60) Provisional application No. 62/825,368, filed on Mar. 28, 2019.

(51) Int. Cl.
*B60W 60/00* (2020.01)
*G01C 21/34* (2006.01)
*G07B 15/02* (2011.01)
*G08G 1/00* (2006.01)

(52) U.S. Cl.
CPC ..... *B60W 60/0059* (2020.02); *G01C 21/3415* (2013.01); *G07B 15/02* (2013.01); *G08G 1/202* (2013.01); *B60W 2050/146* (2013.01); *B60W 2540/041* (2020.02); *B60W 2540/221* (2020.02)

(58) Field of Classification Search
CPC ..... B60W 2050/146; B60W 2540/041; B60W 2540/221; B60W 60/0054; G08G 1/202; G08G 1/096816; G08G 1/096838; G08G 1/205; G01C 21/3415; G01C 21/3438; G07B 15/02

See application file for complete search history.

(56) References Cited

U.S. PATENT DOCUMENTS

| | | | |
|---|---|---|---|
| 10,157,423 B1* | 12/2018 | Fields | G05D 1/0278 |
| 10,496,889 B2* | 12/2019 | Ishii | G06V 20/56 |
| 11,441,916 B1* | 9/2022 | Konrardy | G01C 21/3617 |
| 2015/0234382 A1* | 8/2015 | Ju | G05D 1/021 |
| | | | 701/23 |
| 2015/0371527 A1* | 12/2015 | Kleen | B62D 1/00 |
| | | | 340/457 |
| 2016/0125735 A1* | 5/2016 | Tuukkanen | G08G 1/09 |
| | | | 701/23 |
| 2016/0221575 A1* | 8/2016 | Posch | B60W 50/10 |
| 2017/0113686 A1* | 4/2017 | Horita | B60W 30/18154 |
| 2017/0300762 A1* | 10/2017 | Ishii | B60W 50/0205 |
| 2018/0018895 A1* | 1/2018 | Chan | B60W 40/09 |
| 2018/0113474 A1* | 4/2018 | Koda | G01C 21/3658 |
| 2019/0204830 A1 | 7/2019 | Ogura | |
| 2019/0278263 A1* | 9/2019 | Mason | B60W 50/12 |
| 2019/0311307 A1* | 10/2019 | Ramot | G06Q 10/047 |
| 2019/0322291 A1 | 10/2019 | Tsuda | |
| 2020/0198644 A1* | 6/2020 | Hutchings | B60W 50/14 |
| 2020/0317216 A1* | 10/2020 | Konrardy | B60W 30/182 |
| 2021/0078604 A1* | 3/2021 | Namba | B60W 40/109 |
| 2022/0178707 A1* | 6/2022 | You | G01C 21/3461 |
| 2022/0371580 A1* | 11/2022 | Kusumoto | B60W 10/20 |
| 2023/0075193 A1* | 3/2023 | Bush | G05D 1/0011 |

* cited by examiner

INFORMATION PROCESSING METHOD AND INFORMATION PROCESSING SYSTEM

CROSS REFERENCE TO RELATED APPLICATIONS

This is a continuation application of PCT International Application No. PCT/JP2020/011663 filed on Mar. 17, 2020, designating the United States of America, which is based on and claims priority of U.S. Provisional Patent Application No. 62/825,368 filed on Mar. 28, 2019 and Japanese Patent Application No. 2019-215353 filed on Nov. 28, 2019. The entire disclosures of the above-identified applications, including the specifications, drawings and claims are incorporated herein by reference in their entirety.

FIELD

The present disclosure relates to an information processing method and an information processing system.

BACKGROUND

For example, PTL 1 discloses an autonomous driving assistance device including a determiner which determines using dynamic map data whether autonomous driving by an autonomous vehicle is approved, and a controller which permits autonomous driving of the autonomous vehicle based on the dynamic map data when the determiner determines that the autonomous driving is approved, and displays a notification of disapproval of autonomous driving on a display device when the determiner determines that autonomous driving is disapproved.

CITATION LIST

Patent Literature

PTL 1: WO 2018/074586

SUMMARY

Technical Problem

However, the technique disclosed in PTL 1 may reduce the operational efficiency. For example, in PTL 1, when the controller determines that autonomous driving is disapproved, only the notification of disapproval of autonomous driving is displayed on the display device. This always results in stop of the autonomous vehicle by its user. For this reason, the operational efficiency of the autonomous vehicle is unintentionally reduced.

Thus, an object of the present disclosure is to provide an information processing method and the information processing system which enable suppression of a reduction in operational efficiency of an autonomous vehicle.

Solution to Problem

The information processing method according to one aspect of the present disclosure is an information processing method to be executed by a computer, the information processing method including: obtaining a driving skill of a person who rides an autonomous vehicle, the driving skill representing at least one of whether the person can drive an autonomous vehicle which can be manually driven or a level at which the person can drive; obtaining specifications of a plurality of autonomous vehicles about autonomous driving; obtaining a route for transporting the person; determining deviation risks based on the specifications and the route, each of the deviation risks including at least one of a possibility of deviation of an autonomous driving system including a corresponding one of the plurality of autonomous vehicles from an operational design domain or a degree of the deviation; selecting an autonomous vehicle assigned to transportation of the person from the plurality of autonomous vehicles, according to each of the deviation risks and the driving skill; and sending a notification of the autonomous vehicle selected.

Among these, part of specific aspects may be implemented using a system, a method, an integrated circuit, a computer program, or a computer-readable recording medium such as a CD-ROM, or may be implemented using any combination of a system, a method, an integrated circuit, a computer program, and a recording medium.

Advantageous Effects

According to the information processing method according to the present disclosure, a reduction in operational efficiency can be suppressed.

BRIEF DESCRIPTION OF DRAWINGS

These and other advantages and features will become apparent from the following description thereof taken in conjunction with the accompanying Drawings, by way of non-limiting examples of embodiments disclosed herein.

DESCRIPTION OF EMBODIMENTS

Figure 1:
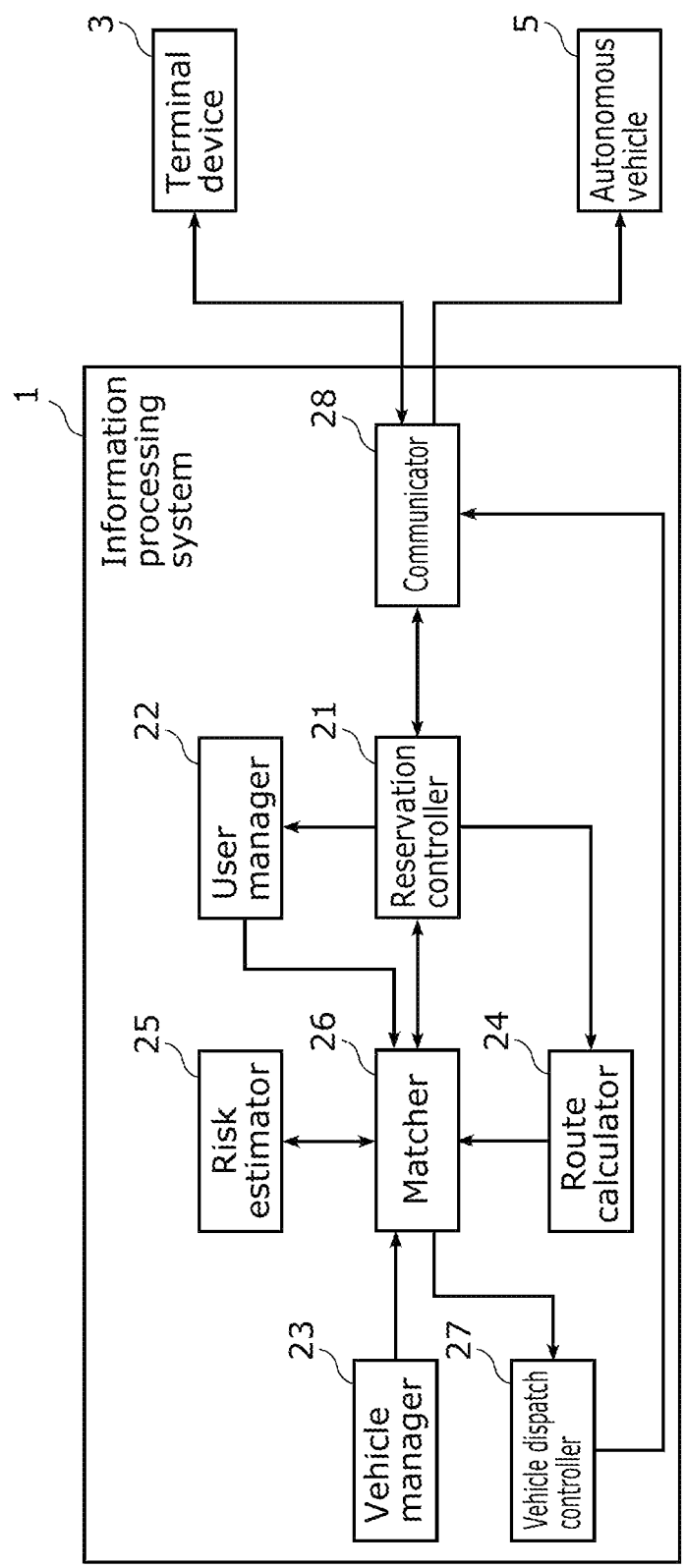
FIG. 1 is a block diagram illustrating an information processing system according to Embodiment 1.

The information processing method according to one aspect of the present disclosure is an information processing method to be executed by a computer. The information processing method includes obtaining a driving skill of a person who rides an autonomous vehicle, the driving skill representing at least one of whether the person can drive an autonomous vehicle which can be manually driven or a level at which the person can drive; obtaining specifications of a plurality of autonomous vehicles about autonomous driving; obtaining a route for transporting the person; determining deviation risks based on the specifications and the route, each of the deviation risks including at least one of a possibility of deviation of an autonomous driving system including a corresponding one of the plurality of autonomous vehicles from an operational design domain or a degree of the deviation; selecting an autonomous vehicle assigned to transportation of the person from the plurality of autonomous vehicles, according to each of the deviation risks and the driving skill; and sending a notification of the autonomous vehicle selected.

According to such a configuration, an autonomous vehicle having a deviation risk corresponding to the driving skill of the person can be assigned. For this reason, a deviation of the autonomous driving system from the operational design domain can be suppressed, or stagnation of the operation for transportation of the person can be suppressed even if such a deviation occurs. Accordingly, a reduction in operational efficiency of the autonomous vehicle can be suppressed.

For example, an autonomous vehicle having a low deviation risk is assigned to a person having a low driving skill (such a person having a driving skill lower than or equal to a threshold). An autonomous vehicle having a high deviation risk (for example, a deviation risk higher than or equal to a threshold) is assigned to a person having a high driving skill (a person having a driving skill higher than or equal to the threshold). This is because a person having a high driving skill can drive the autonomous vehicle having a high deviation risk even if the autonomous vehicle deviates from the operational design domain of the route.

The information processing system according to another aspect of the present disclosure includes a driving skill obtainer which obtains a driving skill of a person who rides an autonomous vehicle, the driving skill representing at least one of whether the person can drive an autonomous vehicle which can be manually driven or a level at which the person can drive; a specification obtainer which obtains specifications of a plurality of autonomous vehicles about autonomous driving; a route calculator which calculates a route for transporting the person; a risk determiner which determines deviation risks based on the specifications obtained by the specification obtainer and the route calculated by the route calculator, each of the deviation risks including at least one of a possibility of deviation of an autonomous driving system including a corresponding one of the plurality of autonomous vehicles from an operational design domain or a degree of the deviation; a selector which selects an autonomous vehicle assigned to transportation of the person from the plurality of autonomous vehicles, according to each of the deviation risks determined by the risk determiner and the driving skill obtained by the driving skill obtainer; and an outputter which sends a notification of the autonomous vehicle selected by the selector.

Such an information processing system also provides the same effects of action as those described above.

The information processing method according to another aspect of the present disclosure further includes obtaining a tolerance of the person with respect to a request to drive. Here, the selecting of the autonomous vehicle assigned to transportation of the person also includes selecting the autonomous vehicle assigned to transportation of the person from the plurality of autonomous vehicles, according to the tolerance.

According to such a configuration, for example, if the person has the tolerance, the person is willing to drive the autonomous vehicle in the manual driving state. For this reason, an autonomous vehicle having a high deviation risk can be presented to the person among the autonomous vehicles corresponding to the driving skill. When the person does not have the tolerance, the person is less willing to drive the autonomous vehicle in the manual driving state. For this reason, an autonomous vehicle having a low deviation risk can be presented to the person among the autonomous vehicles corresponding to the driving skill. Because the person can select and reserve such an autonomous vehicle, a request for unintentional manual driving is suppressed. Additionally, stagnation of transportation of the person caused by a deviation from the operational design domain (ODD) due to assignment of an autonomous vehicle having a deviation risk can be suppressed. Accordingly, the operational efficiency of the autonomous vehicle can be improved.

The information processing method according to another aspect of the present disclosure further includes obtaining a physical condition of the person. Here, the selecting of the autonomous vehicle assigned to transportation of the person also includes selecting the autonomous vehicle assigned to transportation of the person from the plurality of autonomous vehicles, according to the physical condition.

According to such a configuration, for example, when the person who rides the autonomous vehicle is in a good physical condition, an autonomous vehicle having a high deviation risk is presented among the autonomous vehicles corresponding to the driving skill. When the person who rides the autonomous vehicle is not in a good physical condition, an autonomous vehicle having a low deviation risk is presented among the autonomous vehicles. Thus, stagnation of transportation of the person caused by a deviation from the ODD due to assignment of the autonomous vehicle having a high deviation risk to the person who is actually not in a physical condition fitted for driving can be suppressed by assigning the autonomous vehicle having a deviation risk according to whether the person is in a physical condition fitted for driving. Accordingly, the operational efficiency of the autonomous vehicle can be improved.

In the information processing method according to another aspect of the present disclosure, when the person has the driving skill or the driving skill of the person is higher than or equal to the threshold, the selecting of the autonomous vehicle assigned to transportation of the person includes selecting a deviation risk-positive autonomous vehicle from the plurality of autonomous vehicles, the deviation risk-positive autonomous vehicle having the deviation risk or having a deviation risk higher than or equal to the threshold.

According to such a configuration, an autonomous vehicle having a high deviation risk is assigned to a person having a high driving skill. For this reason, a reduction in operational efficiency of the autonomous vehicle can be suppressed because the person drives the autonomous vehicle even if a deviation from the ODD occurs.

In the information processing method according to another aspect of the present disclosure, the deviation risk-positive autonomous vehicle is an autonomous vehicle which has a deviation risk and benefits for the person which are higher than deviation risks and benefits of other autonomous vehicles among the plurality of autonomous vehicles.

According to such a configuration, the person having a high driving skill can be recommended to use an autonomous vehicle having a high deviation risk. This increases people who use autonomous vehicles having a high deviation risk, and thus can improve the operational efficiency of the autonomous vehicle. For example, an autonomous vehicle having benefits is assigned to the person having a high driving skill. In other words, the person can use an autonomous vehicle at a desired time, an autonomous vehicle at a reduced fee, or an autonomous vehicle with comfortable seats or with a high-grade interior and/or equipment.

In the information processing method according to another aspect of the present disclosure, when the person does not have the driving skill or the driving skill of the person is lower than the threshold, the selecting of the autonomous vehicle assigned to transportation of the person includes selecting a deviation risk-negative autonomous vehicle from the plurality of autonomous vehicles, the deviation risk-negative autonomous vehicle not having the deviation risk or having a deviation risk lower than a threshold.

According to such a configuration, an autonomous vehicle having a low deviation risk is assigned to a person having a driving skill. For this reason, an occurrence of a deviation from the ODD is suppressed.

In the information processing method according to another aspect of the present disclosure, the deviation risk-negative autonomous vehicle has a deviation risk lower than deviation risks of other autonomous vehicles among the plurality of autonomous vehicles.

According to such a configuration, an autonomous vehicle having a deviation risk lower than those of the other autonomous vehicles can be assigned to the person having a low driving skill.

The information processing method according to another aspect of the present disclosure further includes changing the route obtained to a different route when the deviation risk-negative autonomous vehicle is not selected. Here, the different route has a deviation risk lower than a deviation risk of the route obtained.

According to such a configuration, a route having a deviation risk lower than that of the obtained route can be presented to a person not having the driving skill or having a low driving skill. This facilitates the travel of the autonomous vehicle on which the person not having the driving skill or having a low driving skill rides, without deviating from the ODD.

The information processing method according to another aspect of the present disclosure further includes sending a notification of a suggestion for improving the driving skill of the person when the deviation risk-negative autonomous vehicle is not selected.

According to such a configuration, the person having a low driving skill can be recommended to improve the driving skill.

The information processing method according to another aspect of the present disclosure further includes calculating a monitoring resource for monitoring the autonomous vehicle selected, according to the deviation risk of the autonomous vehicle selected and the driving skill; calculating a cost for transportation of the person by the autonomous vehicle selected, according to the monitoring resource calculated, a specification of the autonomous vehicle selected, and the route; and sending a notification of the cost calculated.

According to such a configuration, the total cost of autonomous driving of the selected autonomous vehicle including monitoring of the autonomous vehicle can be presented to the person who plans to ride the autonomous vehicle.

The information processing method according to another aspect of the present disclosure further includes calculating a stop risk according to the specification of the autonomous vehicle selected and the deviation risk with respect to the route, the stop risk indicating a possibility that the autonomous vehicle selected may stop on the route; and sending a notification of the stop risk calculated.

According to such a configuration, the stop risk can be preliminarily presented to the person who plans to ride the autonomous vehicle. For example, the person can understand the stop risk, and reserve and determine the dispatch of the autonomous vehicle. This is suitable for cases where there are people who are satisfied if they can move halfway to the destination or near the destination.

The information processing method according to another aspect of the present disclosure further includes determining driving control of the autonomous vehicle selected, according to the specification of the autonomous vehicle selected and the deviation risk with respect to the route; generating a driving plan based on the driving control determined; and sending a notification of the driving plan generated.

According to such a configuration, the driving plan can be presented to the person who plans to ride the autonomous vehicle. For this reason, the person can use the driving plan as a criterion for determining whether the transportation time and the route indicated in the driving plan match the request of the person. For example, when a plurality of driving plans is presented to the person, this person can select a desired driving plan.

The embodiments described below illustrates one specific example of the present disclosure. Numeric values, shapes, materials, components, and arrangement positions of components shown in the embodiment below are exemplary, and should not be construed as limitations to the present disclosure. Moreover, among the components of the embodiments below, the components not described in an independent claim will be described as arbitrary components. In all the embodiments, the contents thereof can also be combined.

The information processing method and the information processing system according to one aspect of the present disclosure will now be specifically described with reference to the drawings.

Embodiment 1

<Configuration: Information Processing System 1>

FIG. 1 is a block diagram illustrating information processing system 1 according to Embodiment 1.

As illustrated in FIG. 1, information processing system 1 is a system which can dispatch autonomous vehicle 5 having an autonomous driving function and a manual driving function to a user in response to a request from the user. Information processing system 1 obtains information indicating the departure day and time, the departure place, and the destination from the user who uses terminal device 3. Thereby, based on the obtained information, information processing system 1 can dispatch autonomous vehicle 5 requested by the user. Autonomous vehicle 5 transits from an autonomous driving state to a manual driving, and vice versa. Information processing system 1, terminal device 3, and one or more autonomous vehicles 5 configure an autonomous driving system. The user is one example of a person which uses information processing system 1.

Information processing system 1 is applied to a form of sharing use of autonomous vehicle 5 provided in ride-sharing service or ride-hailing service, for example.

The ride-sharing service collectively indicates services for connecting a vehicle for transportation to a user who wants to ride the vehicle. In other words, the ride-sharing indicates a share ride of a vehicle such that a user who wants to go to a destination rides on a vehicle already having another user on board to transport the user from the departure place to the destination or a place near the destination.

The ride-hailing service indicates services which enable transportation of a user, who wants to go to a destination, from a designated place to the destination in response to a request from the user to dispatch a vehicle for transportation to the designated place. The ride-hailing service can also be turned to the ride-sharing service by allowing a share ride of another user during transportation of the user from the designated place to the destination.

The configuration of information processing system 1 will be specifically described.

Information processing system 1 includes reservation controller 21, user manager 22, vehicle manager 23, route calculator 24, risk estimator 25, matcher 26, vehicle dispatch controller 27, and communicator 28.

[Reservation Controller 21]

Reservation controller 21 is a processor which controls user manager 22, matcher 26, route calculator 24, and the like in the reservation of autonomous vehicle 5 by the user to connect the user to autonomous vehicle 5 suitable for the user. When reservation controller 21 obtains reservation information of the user from terminal device 3 through communicator 28, reservation controller 21 transmits a request of the user included in the reservation information and information indicating the user skill to user manager 22. Reservation controller 21 also transmits departure place information indicating the departure place of the user and destination information indicating the destination of the user, which are included in the reservation information, to route calculator 24. Reservation controller 21 outputs the departure place information, the destination information, departure time information indicating the time to depart the departure place, and arrival time information indicating the arrival time to arrive at the destination, which are included in the reservation information, to matcher 26. The departure time and the arrival time are arbitrarily output.

Here, the reservation information includes the departure place information, the destination information, the departure time information, the arrival time information, the user request information, and the skill information indicating the driving skill of the user who plans to ride autonomous vehicle 5. The request information is the information indicating the tolerance of the user to a request to the user to drive, the type of autonomous vehicle 5, the maximum number of passengers, the body size, and the presence/absence of non-smoking vehicles, for example. The tolerance is the presence/absence of the tolerance or the degree of tolerance. Specifically, the tolerance indicates whether the user having the driving skill is willing to drive autonomous vehicle 5 in a manual driving state or which degree of manual driving the user allows. The skill information includes the information indicating whether the user can drive autonomous vehicle 5 when autonomous vehicle 5 transits to the manual driving state (for example, whether the user has a driver's license) and the information such as the total driving time. The driving in the driving skill may be the driving through standard operational devices for manual driving such as a wheel and pedals, or may be simple driving through an operational device such an emergency stop button or a touch panel.

When one or more autonomous vehicles 5 are selected to the reservation made by the user, reservation controller 21 outputs candidate information, which indicates candidates for autonomous vehicle 5 according to the reservation information of the user, to terminal device 3 through communicator 28.

[User Manager 22]

As a driving skill obtainer, user manager 22 obtains the skill information and the request information from the reservation information, and manages these pieces of information. Here, the skill information indicates a driving skill of the user who rides autonomous vehicle 5, the driving skill representing at least one of whether the person can drive autonomous vehicle 5 which can be manually driven or a level at which the person can drive.

User manager 22 also stores the tolerance of the user included in the request information.

User manager 22 may obtain and manage physical condition information indicating the physical condition of the user. The physical condition indicates the health condition and the presence/absence or degree of drunkenness. The physical condition information may be input by the user in the reservation, or may be estimated from a captured image of the user's face, for example.

User manager 22 stores the obtained skill information and request information for each user. Every time when user manager 22 obtains the skill information and the request information from reservation controller 21, user manager 22 updates the obtained information. User manager 22 outputs the skill information and the request information to matcher 26.

[Vehicle Manager 23]

As a specification obtainer, vehicle manager 23 obtains and manages the specifications of a plurality of autonomous vehicles 5 about autonomous driving. Here, the specification about autonomous driving indicates the vehicle type, the driving ability, the sensing ability, and the processing ability of autonomous vehicle 5. The vehicle type includes the category of the vehicle such as a sedan or a wagon, the size, and the shape. The driving ability includes the acceleration force, the maximum speed, the braking force, and the turning ability such as the minimum turning radius. The sensing ability includes the sensing distance, the sensing angle, the resolution, and the sensing target. The sensing may include detection of an object or a scene. The processing ability includes the processing rate, the number of tasks to be simultaneously processed, and the storage capacity. Other specifications include the type of the vehicle, the maximum number of passengers, the type of the seat, the owner, the displacement, smoking/non-smoking, the gas mileage, the volume of the fuel tank, and the battery capacity. To be noted, the "specification" basically indicates the specification about autonomous driving unless otherwise specified. In response to a request from matcher 26, vehicle manager 23 outputs the vehicle specification information indicating the specification of autonomous vehicle 5.

[Route Calculator 24]

Route calculator 24 obtains the departure place information and the destination information from reservation controller 21, and obtains candidates for the route for transporting the user through calculation. For example, based on the map information stored in a memory device (not illustrated), route calculator 24 calculates one or more routes from the departure place of the user to the destination thereof. For example, route calculator 24 calculates routes on a map to which a route having the shortest distance from the departure place of the user to the destination thereof and alternative routes calculated according to the road traffics are mapped. Route calculator 24 outputs the route information to matcher 26, the route information corresponding to the calculated candidates (results) for the route.

[Risk Estimator 25]

As a risk determiner, based on the specifications and the routes indicated in the route information, risk estimator 25 estimates (or determines) deviation risks each including at least one of a possibility of deviation of the autonomous driving system including a corresponding one of autonomous vehicles 5 from the operational design domain or the degree of the deviation.

Here, the deviation risk is an index indicating a possibility that autonomous vehicle 5 having a specification, when driving a route, may deviate from the operational design domain (ODD) set to the route. The operational design domain indicates the condition designed such that the autonomous driving system should function. The condition includes conditions related with geography, roads, environments, the traffic, the speed, temporary limitations, and the driving mode. The ODD is set such that the autonomous driving system normally operates when all the conditions are satisfied. In other words, the autonomous driving system is set without deviating from the ODD. When any one of the conditions is not satisfied, autonomous driving may be failed. For this reason, switching to the manual driving state or stop of driving is demanded.

Risk estimator 25 obtains the route information and the vehicle specification information, which are obtained through matcher 26, and estimates the deviation risk of autonomous vehicles 5 for each route information. The route information includes static information such as the widths of roads, the curvatures thereof, and the number of lanes and dynamic (or quasi-static) information such as the presence/absence of road constructions, the weather, the traffic, and the frequencies of occurrence of accidents. Autonomous vehicle 5 having a high specification indicated in the vehicle specification information has high driving performance or high safety performance. Thus, a relatively low deviation risk is likely to be estimated. Autonomous vehicle 5 having a low specification indicated in the vehicle specification information has lower driving performance or safety performance than that of autonomous vehicle 5 having a high specification. Thus, a relatively high deviation risk is likely to be estimated.

Risk estimator 25 outputs risk information to matcher 26 as a result of determination of the estimated deviation risk of autonomous vehicles 5 for each of the routes.

[Matcher 26]

For the user who makes a reservation to dispatch autonomous vehicle 5, matcher 26 as a selector selects one or more autonomous vehicles 5 assigned to transportation of the user from a plurality of autonomous vehicles 5, according to the deviation risks of autonomous vehicles 5 and the driving skill of the user for each of the routes. In other words, matcher 26 selects one or more autonomous vehicles 5 corresponding to the request from the user and the driving skill of the user, and outputs the selected one or more candidates for autonomous vehicle 5 to reservation controller 21.

Specifically, matcher 26 obtains the departure time information and the arrival time information from reservation controller 21, obtains the skill information and the request information from user manager 22, obtains the vehicle specification information from vehicle manager 23, and obtains the route information from route calculator 24. Matcher 26 also obtains the risk information from risk estimator 25 by outputting the vehicle specification information and the route information to risk estimator 25. Matcher 26 selects one or more autonomous vehicles 5 satisfying these pieces of information from a plurality of autonomous vehicles 5.

More specifically, in selection of autonomous vehicle 5 assigned to transportation of the user, when the user has the driving skill or the driving skill of the user is higher than or equal to the threshold, matcher 26 selects one or more autonomous vehicles 5 having the deviation risk or having a deviation risk higher than or equal to the threshold from a plurality of autonomous vehicles 5. For example, matcher 26 selects one or more autonomous vehicles 5 having a high deviation risk for the user having a driving skill higher than or equal to the threshold. Manual driving is highly possibly requested in autonomous vehicle 5 having a high deviation risk because such autonomous vehicle 5 is more likely to deviate from the ODD. In short, matcher 26 selects one or more autonomous vehicles 5 having a high deviation risk for the user having a high driving skill because such a user can drive autonomous vehicle 5 even when it transits to the manual driving state. When autonomous vehicle 5 having a low deviation risk is available, matcher 26 may select such autonomous vehicle 5 to the user having a driving skill higher than or equal to the threshold.

For example, in selection of autonomous vehicle 5 assigned to transportation of the user, when the user does not have the driving skill or the driving skill of the person is lower than the threshold, matcher 26 selects one or more autonomous vehicles 5 not having the deviation risk or having a deviation risk lower than the threshold from a plurality of autonomous vehicles 5. For example, matcher 26 selects one or more autonomous vehicles 5 having a low deviation risk for the user having a driving skill lower than the threshold. In autonomous vehicle 5 having a low deviation risk, the driving itself by the user or a high driving skill of the user is not requested. Here, autonomous vehicle 5 not having the deviation risk or having a deviation risk lower than the threshold indicates autonomous vehicle 5 having a deviation risk lower than those of other autonomous vehicles 5 among a plurality of autonomous vehicles 5. Matcher 26 selects one or more autonomous vehicles 5 having a low deviation risk from the plurality of autonomous vehicles 5 for the user having a low driving skill because such a user cannot drive autonomous vehicle 5 when it transits to the manual driving state. Here, the user having a driving skill lower than the threshold indicates the user who cannot drive autonomous vehicle 5 in the manual driving state or can drive autonomous vehicle 5 in the manual driving state under a limited condition. Examples of the limited condition include a condition on time and a condition on the operational content.

Furthermore, in selection of autonomous vehicle 5 assigned to transportation of the user, matcher 26 may select one or more autonomous vehicles 5 assigned to transportation of the user from the plurality of autonomous vehicles 5, according to the tolerance included in the request information. For example, matcher 26 selects one or more autonomous vehicles 5 having a low deviation risk for a user who does not have the tolerance despite having a driving skill higher than or equal to the threshold. In short, matcher 26 selects one or more autonomous vehicles 5 having a low deviation risk for the user who does not have the tolerance despite having a high driving skill, because such a user will not drive autonomous vehicle 5 even when autonomous vehicle 5 transits to the manual driving state.

Furthermore, matcher 26 may also select autonomous vehicle assigned to transportation of the user from a plurality of autonomous vehicles 5, according to the physical condition of the user. For example, matcher 26 selects one or more autonomous vehicles 5 having a low deviation risk for a user who is in a bad physical condition despite having a driving skill higher than or equal to the threshold. This is because the user in a bad physical condition may be difficult to normally drive.

Thus, among the selected one or more autonomous vehicles 5, according to the driving skill, matcher 26 selects one or more autonomous vehicles 5 which can drive the routes indicated in the route information for a period from the departure time to the arrival time desired by the user.

Matcher 26 generates candidate information including candidate autonomous vehicles 5 and candidate routes. Specifically, the candidate information may include one or more candidates for autonomous vehicle 5 as a result of selection and the routes which one or more candidates for autonomous vehicle 5 drive, as well as the specifications of one or more autonomous vehicles 5 and the merits (i.e., benefits) of one or more candidates for autonomous vehicle 5. Matcher 26 transmits the candidate information to terminal device 3 through reservation controller 21 and communicator 28. Here, the merits indicate the merits with respect to the temporal costs such as the driving time of autonomous vehicle 5 which drives the route, the performance of the vehicle, and equipment and monetary costs. Examples of the merits include the ride time, the adaptability to the desired time zone, the quietness, the seat quality, and the usage fee. The candidate information may include demerits instead of or in addition to merits. Besides, the candidate information may also include the reservation information such as the departure place information, the destination information, the departure time information, and the arrival time information, and the tolerance of the user.

Autonomous vehicle 5 having the deviation risk or having a deviation risk higher than or equal to the threshold is an autonomous vehicle which has a deviation risk and benefits for the user which are higher than those of other autonomous vehicles 5 among the plurality of autonomous vehicles 5. In other words, autonomous vehicle 5 having a high deviation risk has benefits (or rewards) such as a higher quality seat and a lower usage fee than those of autonomous vehicles 5 having a low deviation risk (i.e., other autonomous vehicles 5).

Moreover, in response to the candidate information, matcher 26 obtains determined information, which indicates autonomous vehicle 5 and the route desired by the user, from terminal device 3 through communicator 28 and reservation controller 21. Matcher 26 outputs the determined information to vehicle dispatch controller 27, and sends a notification thereof. Here, the determined information includes the vehicle information specifying autonomous vehicle 5 desired by the user, the route information of the route that autonomous vehicle 5 will drive, the departure place information, the destination information, the departure time information, the arrival time information, the request information, and the skill information.

[Vehicle Dispatch Controller 27]

Vehicle dispatch controller 27 obtains the determined information from matcher 26, and transmits a dispatch instruction command to autonomous vehicle 5 through communicator 28 or the like to dispatch autonomous vehicle 5 indicated in the vehicle information included in the obtained determined information. In other words, vehicle dispatch controller 27 dispatches autonomous vehicle 5 indicated in the vehicle information to the departure place indicated in the departure place information at the time indicated in the departure time information. Here, the dispatch instruction command includes the vehicle information, the route information of the route which autonomous vehicle 5 is going to drive, the departure place information, the destination information, the departure time information, and the arrival time information.

Moreover, vehicle dispatch controller 27 transmits the dispatch instruction command to autonomous vehicle 5 and transmits reservation result information to terminal device 3 through communicator 28 or the like. The reservation result information indicates a result of the accepted reservation of the vehicle which satisfies the conditions desired by the user, such as desired autonomous vehicle 5, the route information, the departure place information, the destination information, the departure time information, the arrival time information, and the request information.

[Communicator 28]

Communicator 28 is a communication module wirelessly or wiredly communicable with terminal device 3 and autonomous vehicle 5 through a network not illustrated. Communicator 28 receives the reservation information from terminal device 3, transmits the candidate information to terminal device 3, and receives the determined information which is determined by the user and indicates autonomous vehicle 5 and the like. When vehicle dispatch controller 27 determines autonomous vehicle 5 to be dispatched, communicator 28 transmits the dispatch instruction command to autonomous vehicle 5, and transmits the reservation result information to terminal device 3. Communicator 28 is one example of an outputter.

[Terminal Device 3]

Terminal device 3 is a personal computer, a smartphone, or a tablet terminal communicably connected to information processing system 1 through a network or the like. By accepting a reservation input from the user with respect to the dispatch of autonomous vehicle 5, terminal device 3 transmits the reservation information to information processing system 1, and receives the candidate information generated by matcher 26. Terminal device 3 also transmits the determined information to information processing system 1 in response to the sent candidate information, the determined information indicating autonomous vehicle 5 desired by the user among one or more candidates for autonomous vehicle 5.

When terminal divide 3 obtains the reservation result information, terminal device 3 receives and presents the conditions which the user desires, such as desired autonomous vehicle 5, the route information, the departure place information, the destination information, the departure time information, the arrival time information, and the request information. The presentation may be performed by display, a vocal output, or the like.

[Autonomous Vehicle 5]

Autonomous vehicle 5 is a vehicle communicably connected to information processing system 1 through a network or the like. According to the driving environment, autonomous vehicle 5 transits from the autonomous driving state to the manual driving state, and vice versa. For example, in an environment having difficulties in autonomous driving, in order to switch autonomous driving to manual driving, autonomous vehicle 5 recommends the user to perform manual driving. For example, in an environment having difficulties in autonomous driving, autonomous vehicle 5 recommends the user to perform manual driving, according to the driving skill of the user.

To be noted, in the case where a deviation from the ODD results in switch to the manual driving state by the user, autonomous vehicle 5 switches the manual driving state to the autonomous driving state in response to cancellation of the deviation from the ODD. In this case, the user quits driving autonomous vehicle 5.

<Operation>

The operation performed by information processing system 1 having such a configuration will be described with reference to FIG. 2.

Figure 2:
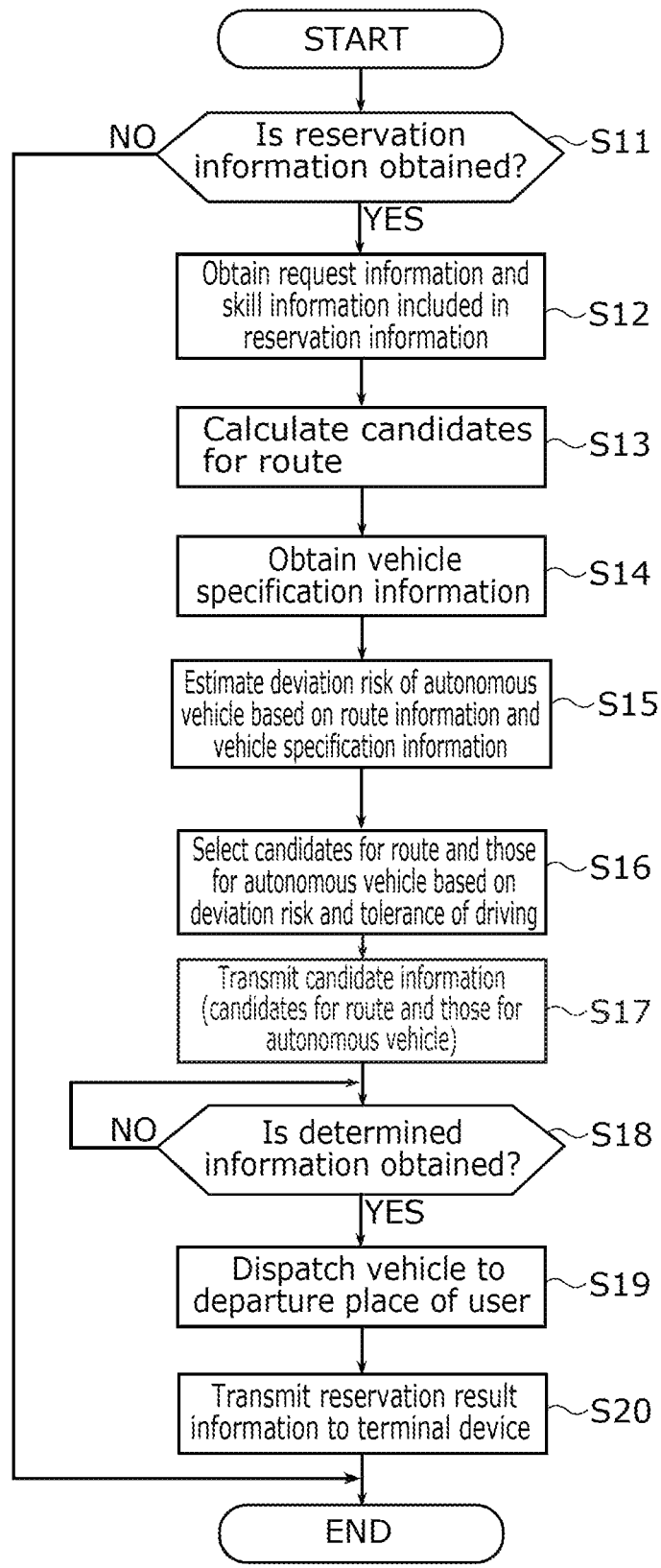
FIG. 2 is a flowchart illustrating an operation of the information processing system according to Embodiment 1.

FIG. 2 is a flowchart illustrating an operation of information processing system 1 according to Embodiment 1.

Initially, the reservation information such as the departure place of the user, the destination of the user, the request from the user, and the driving skill of the user is input by terminal device 3 operated by the user. Terminal device 3 transmits the reservation information to information processing system 1. At least one of departure time in the departure place or the arrival time to arrive at the destination is arbitrarily input to terminal device 3.

Reservation controller 21 in information processing system 1 determines whether the reservation information is obtained (S11). When reservation controller 21 does not obtain the reservation information of the user (NO in S11), information processing system 1 terminates the processing.

When reservation controller 21 obtains the reservation information of user (YES in S11), user manager 22 obtains the request information and the skill information included in the reservation information from reservation controller 21 (S12).

User manager 22 outputs the skill information and the request information to matcher 26.

When route calculator 24 obtains the departure place information and the destination information from reservation controller 21, route calculator 24 calculates candidates for the route for transporting the user (S13). Route calculator 24 outputs the route information to matcher 26, the route information indicating the calculated candidates for the route.

In response to the request from matcher 26, vehicle manager 23 outputs pieces of vehicle specification information of autonomous vehicles 5 corresponding to the request to matcher 26. Matcher 26 obtains the pieces of vehicle specification information (S14).

Risk estimator 25 obtains the route information obtained through matcher 26 and the vehicle specification information, and estimates the deviation risks of autonomous vehicles 5 for each of the routes indicated in the route information (S15). Risk estimator 25 estimates the deviation risks of autonomous vehicles 5 according to the specifications of autonomous vehicles 5 indicated in the vehicle specification information, the static information indicated in the route information, such as the widths of the roads in the routes, and the dynamic information such as the presence/absence of road construction, the road traffic, the traffic of pedestrians, and the presence/absence of places of frequent accidents. Risk estimator 25 estimates the deviation risks of autonomous vehicles 5 for each of the routes.

For example, when the route indicated in the route information includes a place where a large crowd is present, risk estimator 25 estimates a higher deviation risk for a low-performance autonomous vehicle 5 than that of a high-performance autonomous vehicle 5.

Because autonomous vehicle 5 having a high deviation risk is more likely to be switched to the manual driving state, the user should have a high driving skill. Because autonomous vehicle 5 having a low deviation risk is less likely to be switched to the manual driving state, the level of the driving skill of the user is not so problematic.

The processings in steps S13 and S14 may be performed in parallel.

Based on the skill information and the risk information, matcher 26 selects candidates for the route and those for autonomous vehicle 5 (S16). Specifically, matcher 26 obtains the skill information and the request information from user manager 22, obtains the risk information from risk estimator 25, and obtains a list of the routes and vehicles subjected to the risk estimation. Matcher 26 performs the following processing for each of the routes in the list. When the user has the driving skill or the driving skill of the person is higher than or equal to the threshold, that is, when the user can drive, matcher 26 selects one or more autonomous vehicles 5 having the deviation risk or a deviation risk higher than or equal to the threshold from a plurality of autonomous vehicles 5 in the list. When the tolerance of the user is lower than the threshold despite having the driving skill or a driving skill higher than or equal to the threshold, matcher 26 selects one or more autonomous vehicles 5 having a low deviation risk or a deviation risk lower than the threshold from the plurality of autonomous vehicles 5. When the user does not have the driving skill or the driving skill of the user is lower than the threshold, matcher 26 selects one or more autonomous vehicles 5 not having the deviation risk or having a deviation risk lower than the threshold from the plurality of autonomous vehicles 5.

Matcher 26 transmits the candidate information including the selected autonomous vehicles 5 and routes to terminal device 3 through communicator 28 or the like (S17). Specifically, matcher 26 obtains the departure time information and the arrival time information from reservation controller 21. Based on the departure time information and the arrival time information, for each of the routes in the list, matcher 26 then selects one or more candidates for autonomous vehicle 5 which can drive the route in a period from the departure time to the arrival time desired by the user, from one or more autonomous vehicles 5 selected from the list. Matcher 26 generates the candidate information including autonomous vehicles 5 and the routes selected as the candidates, and transmits the candidate information to terminal device 3 through communicator 28.

Although not illustrated, terminal device 3 obtains the candidate information, and displays the obtained candidate information. The user determines desired autonomous vehicle 5 and the desired route from the displayed candidate information. Terminal device 3 transmits the determined information including the determined autonomous vehicle 5 and the determined route to information processing system 1.

Information processing system 1 determines whether the determined information is obtained (S18).

When information processing system 1 does not obtain the determined information (NO in S18), information processing system 1 returns the processing to step S18. When the determined information is not obtained after a predetermined period has passed, information processing system 1 may terminate the processing.

When information processing system 1 obtains the determined information (YES in S18), matcher 26 in information processing system 1 outputs the determined information to vehicle dispatch controller 27. When vehicle dispatch controller 27 obtains the determined information from matcher 26, vehicle dispatch controller 27 transmits the dispatch instruction command to autonomous vehicle 5, which is indicated in the obtained determined information, through communicator 28 to dispatch autonomous vehicle 5 indicated in the obtained determined information. In other words, vehicle dispatch controller 27 controls autonomous vehicle 5 indicated in the vehicle information included in the determined information to dispatch autonomous vehicle 5 to the departure place (S19). Thereby, autonomous vehicle 5, which receives the dispatch instruction command, moves to arrive at the departure place at the departure time.

Vehicle dispatch controller 27 also transmits the dispatch instruction command to autonomous vehicle 5 and transmits the reservation result information to terminal device 3 through communicator 28 or the like (S20). Thereby, the reservation result information indicating the result of reservation about dispatch of autonomous vehicle 5 desired by the user is displayed on terminal device 3. Information processing system 1 then terminates the processing.

<Effects of Action>

The effects of action of the information processing method according to the present embodiment and information processing system 1 according to the present embodiment will now be described.

As described above, the information processing method according to the present embodiment and information processing system 1 according to the present embodiment can assign autonomous vehicle 5 having a deviation risk corresponding to the driving skill of a person to the person. For this reason, the autonomous driving system can suppress the deviation of the autonomous vehicle from the operational design domain, and can suppress delay of transportation of the person even when the autonomous vehicle deviates from the operational design domain. Accordingly, a reduction in operational efficiency of autonomous vehicle 5 can be suppressed.

For example, autonomous vehicle 5 having a low deviation risk is assigned to a user having a low driving skill. Autonomous vehicle 5 having a high deviation risk is assigned to a user having a high driving skill. This is because the user having a high driving skill can drive autonomous vehicle 5 even when autonomous vehicle 5 having a high deviation risk deviates from the operational design domain of the route. Thus, autonomous vehicle 5 having a high deviation risk and autonomous vehicle 5 having a low deviation risk both operate, resulting an improvement in operational efficiency of autonomous vehicle 5.

Embodiment 2

<Configuration>

The information processing method according to the present embodiment and the configuration of information processing system 1 according to the present embodiment will be described with reference to FIG. 3.

Figure 3:
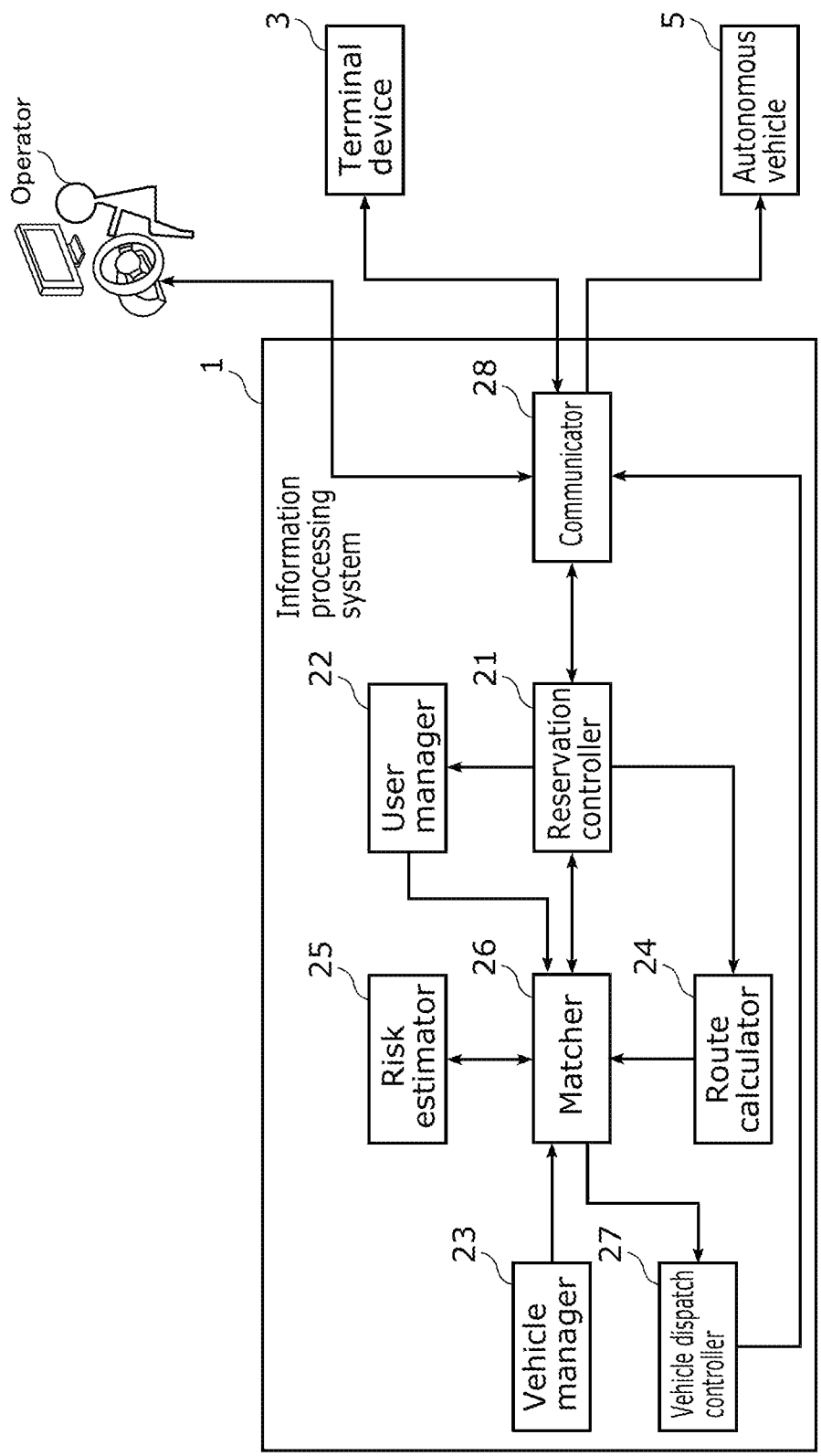
FIG. 3 is a block diagram illustrating an information processing system according to Embodiment 2.

FIG. 3 is a block diagram illustrating information processing system 1 according to Embodiment 2.

Unless otherwise specified, other configurations according to the present embodiment are identical to those in Embodiment 1, and identical referential numerals will be given to identical configurations to omit detailed descriptions thereof.

The autonomous driving system according to the present embodiment includes an operator who remotely monitors or operates autonomous vehicle 5. A remote system for remote monitoring or remote operation by the operator obtains the vehicle information on autonomous vehicle 5 from autonomous vehicle 5 in a remote place, and enables remote monitoring or remote operation of autonomous vehicle 5.

[Matcher 26]

Matcher 26 calculates monitoring resources, which are resources for monitoring selected one or more autonomous vehicles 5, according to the deviation risks of the selected one or more autonomous vehicles 5 in the generation of the candidate information and the driving skill. The monitoring resource may be a resource of the operator (such as the time or the number of steps), or may be a calculational resource needed in the monitoring processing, such as a calculation amount or a communication amount.

Matcher 26 calculates the cost of transportation of the user by the selected one or more autonomous vehicles 5 according to the calculated monitoring resources, the specifications of the selected one or more autonomous vehicles 5, and the route, and notifies the user of the calculated cost to the user through communicator 28. Specifically, matcher 26 calculates the temporal cost or the monetary cost according to the amount of the monitoring resource, the route driving time, and the usage fee of autonomous vehicle 5, and transmits the cost information indicating the result of calculation and the candidate information to terminal device 3 through communicator 28 or the like. The monetary cost may be expressed in terms of price, or may be expressed in terms of point.

<Operation>

The operation of information processing system 1 having such a configuration will be described with reference to FIG. 4.

Figure 4:
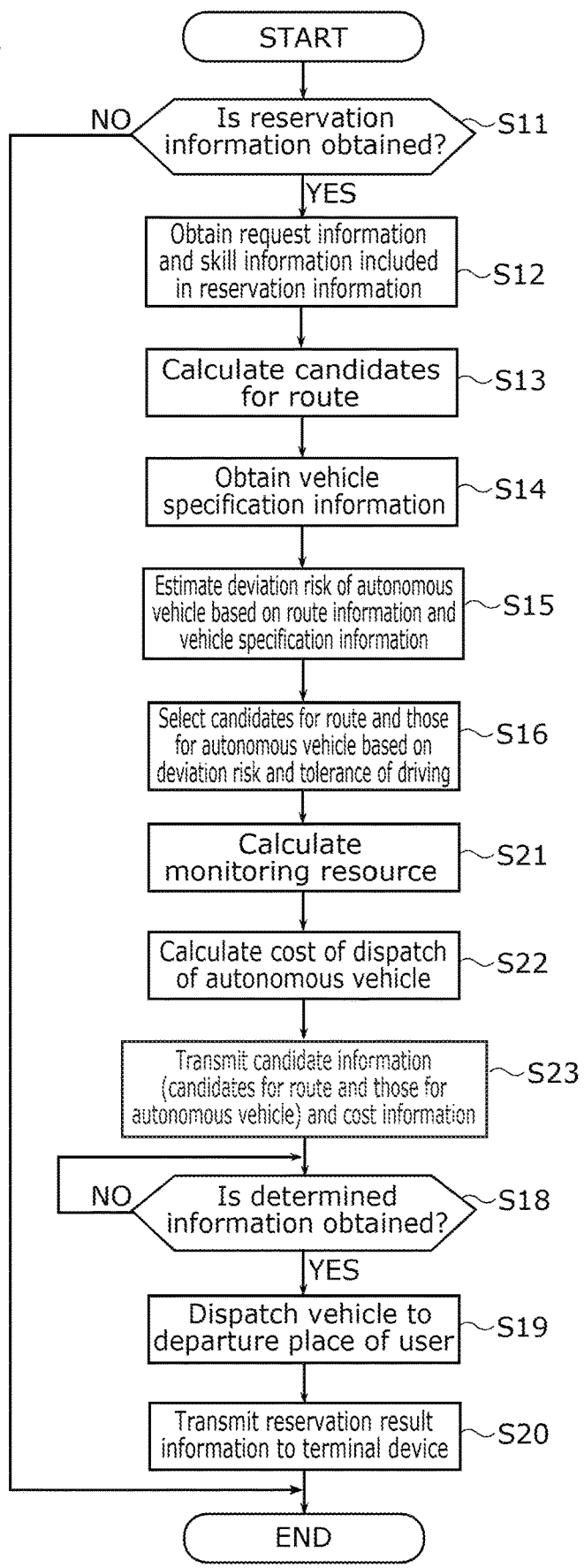
FIG. 4 is a flowchart illustrating an operation of the information processing system according to Embodiment 2.

FIG. 4 is a flowchart illustrating an operation of information processing system 1 according to Embodiment 2.

Identical reference numerals will be given to processings identical to those in FIG. 2, and the descriptions thereof will be appropriately omitted.

In the processing of information processing system 1, after the processings in steps S11 to S16 are performed, matcher 26 calculates monitoring resources, which are resources for monitoring the selected one or more autonomous vehicles 5, according to the deviation risks of the selected one or more autonomous vehicles 5 and the driving skill (S21).

Next, matcher 26 calculates the costs of transportation of the user by the selected one or more autonomous vehicles 5, according to the calculated monitoring resources, the specifications of the selected one or more autonomous vehicles 5, and the route (S22).

Next, matcher 26 transmits the candidate information, which includes the selected one or more candidates for autonomous vehicle 5 and the candidates for the route indicated in the route information, and the cost information to terminal device 3 through communicator 28 or the like (S23).

Information processing system 1 then goes to step S18 to perform the processing identical to that in FIG. 2.

<Effects of Action>

Next, the effects of action of the information processing method according to the present embodiment and information processing system 1 according to the present embodiment will be described.

As described above, the information processing method according to the present embodiment and information processing system 1 according to the present embodiment can present the total cost of autonomous driving including the monitoring of the selected autonomous vehicle 5 to the user who plans to ride autonomous vehicle 5. For this reason, this user can know the presented costs of the candidates, and can reserve and determine desired autonomous vehicle 5.

The information processing method according to the present embodiment and information processing system 1 according to the present embodiment can also provide the same effects of action as those in Embodiment 1.

Embodiment 3

<Configuration>

The information processing method according to the present embodiment and the configuration of information processing system 1 according to the present embodiment will be described.

Other configurations in the present embodiment are identical to those in Embodiment 1 and the like unless otherwise specified, and identical reference numerals will be given to such identical configurations to omit detailed descriptions thereof.

[Matcher 26]

Matcher 26 calculates a stop risk indicating a possibility that the selected one or more autonomous vehicles 5 may stop on the route, according to the specifications of the selected one or more autonomous vehicles 5 and the deviation risk with respect to the route, and sends a notification of the calculated stop risk. For example, while the candidates for the route and those for autonomous vehicle 5 according to the driving skill are presented as the candidate information to the user, the deviation risks of the candidates are not always the same. Autonomous vehicle 5 having a high deviation risk has a possibility of switching to the manual driving state on the route or stop or cancel of driving. On the other hand, the user may have difficulties in understanding the deviation risk even if the deviation risk is presented as it is to the user. For this reason, matcher 26 transmits not only the candidate information but also the calculated stop risk to terminal device 3 through communicator 28 or the like.

<Operation>

The operation performed by information processing system 1 having such a configuration will be described with reference to FIG. 5.

Figure 5:
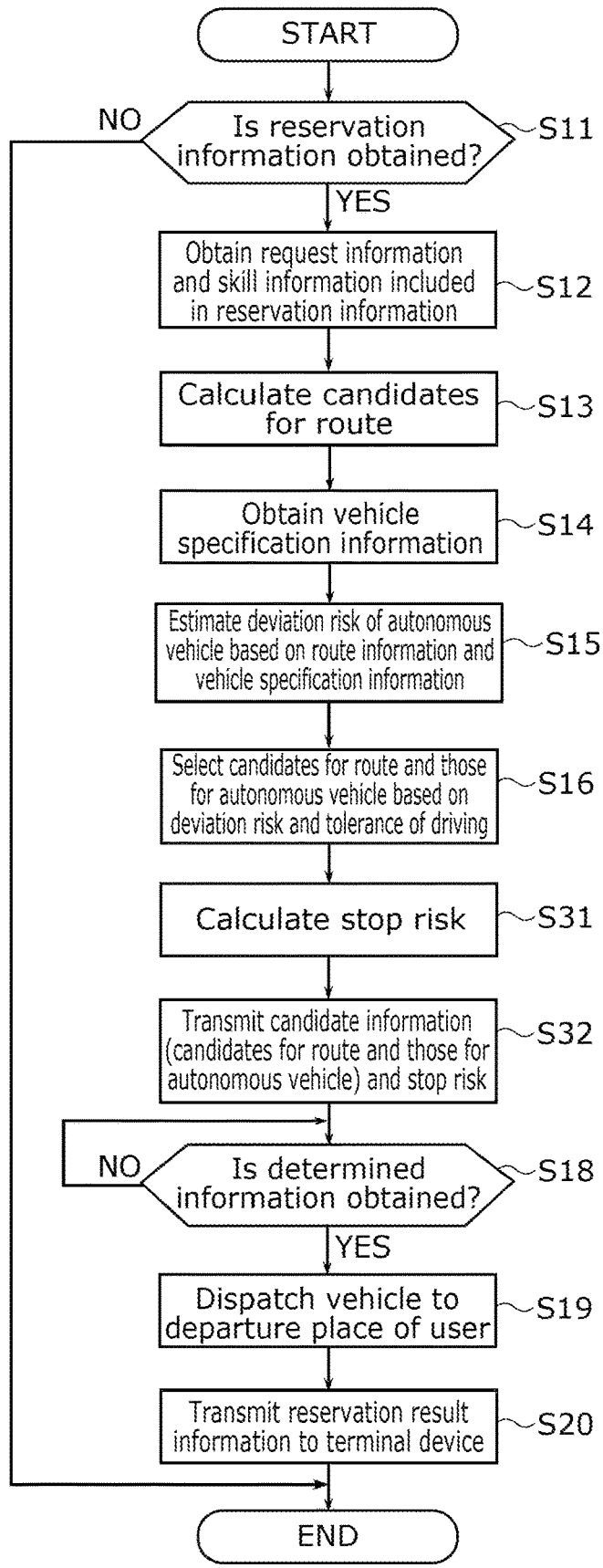
FIG. 5 is a flowchart illustrating an operation of the information processing system according to Embodiment 3.

FIG. 5 is a flowchart illustrating an operation of information processing system 1 according to Embodiment 3.

Identical reference numerals will be given to the processings identical to those in FIG. 2, and the descriptions thereof will be appropriately omitted.

After the processings in steps S11 to S16 are performed in the processing of information processing system 1, matcher 26 calculates the stop risk indicating a possibility that the selected one or more autonomous vehicles 5 may stop on the route, according to the specifications of the selected one or more autonomous vehicles 5 and the deviation risk with respect to the route (S31).

Next, matcher 26 transmits the candidate information (including the selected one or more candidates for autonomous vehicle 5 and the candidates for the route indicated in the route information) and the stop risk to terminal device 3 through communicator 28 or the like (S32).

Information processing system 1 then goes to step S18 to perform the processing identical to that in FIG. 2.

<Effects of Action>

Next, the effects of action of the information processing method according to the present embodiment and information processing system 1 according to the present embodiment will be described.

As described above, the information processing method according to the present embodiment and information processing system 1 according to the present embodiment can preliminarily present the stop risk to the user who plans to ride autonomous vehicle 5. For example, this user can understand the stop risk, and reserve and determine the dispatch of autonomous vehicle 5. This is suitable for cases where there are users who are satisfied if they can move halfway to the destination or near the destination.

The information processing method according to the present embodiment and information processing system 1 according to the present embodiment can also provide the same effects of action as those in Embodiment 1.

Embodiment 4

<Configuration>

The information processing method according to the present embodiment and the configuration of information processing system 1 according to the present embodiment will be described.

Other configurations in the present embodiment are identical to those in Embodiment 1 and the like unless otherwise specified, and identical reference numerals will be given to such identical configurations to omit detailed descriptions thereof.

[Matcher 26]

Matcher 26 determines the driving control for driving of the selected autonomous vehicles 5 according to the specifications of the selected one or more autonomous vehicles 5 and the deviation risk with respect to the route, and generates the driving plan based on the determined driving control. When the driving plan is preliminarily prepared, the driving plan may be generated by changing the prepared driving plan. A notification of the generated driving plan is sent to autonomous vehicle 5 through communicator 28. Specifically, matcher 26 changes the speed, the acceleration, the deceleration, the steering angle, and the like included in the driving plan, according to the deviation risk. For example, when the deviation risk is lower than the threshold, the range of tolerance with respect to the speed, the acceleration, the deceleration, the steering angle, and the like may be set to be relatively wider. When the deviation risk is higher than or equal to the threshold, the range of tolerance may be set to be relatively narrower.

Matcher 26 may update the reservation information from the generated driving plan. When the reservation information is updated, matcher 26 sends a notification of the updated reservation information to terminal device 3 through communicator 28 or the like. Here, the driving plan refers to the information indicating the driving control of autonomous vehicle 5 which drives the route, and the driving control of the speed, the acceleration, the deceleration, the steering angle, and the like of autonomous vehicle 5 on the route.

Here, even in the case of the same route, the speed, the acceleration, the deceleration, the steering angle, and the like indicated in the driving plan may be varied according to the performance of autonomous vehicle 5. For example, in some cases, autonomous vehicle 5 having high performance may drive at 30 km/h in a predetermined zone on the route whereas autonomous vehicle 5 having low performance may drive only at 10 km/h in the same zone. In such cases, for example, some candidates selected for autonomous vehicle 5 and the route may cause a delay with respect to the scheduled arrival time.

To address this, matcher 26 determines whether to update the reservation information, according to the generated driving plan. Specifically, when matcher 26 determines a change of at least one of the departure time or the arrival time corresponding to each of the selected autonomous vehicles 5 according to the driving plan, matcher 26 transmits the candidate information and new reservation information including the changed departure time information and arrival time information, which are obtained through reservation controller 21, to terminal device 3 through communicator 28 or the like <Operation>

The operation performed by information processing system 1 having such a configuration will be described with reference to FIG. 6.

Figure 6:
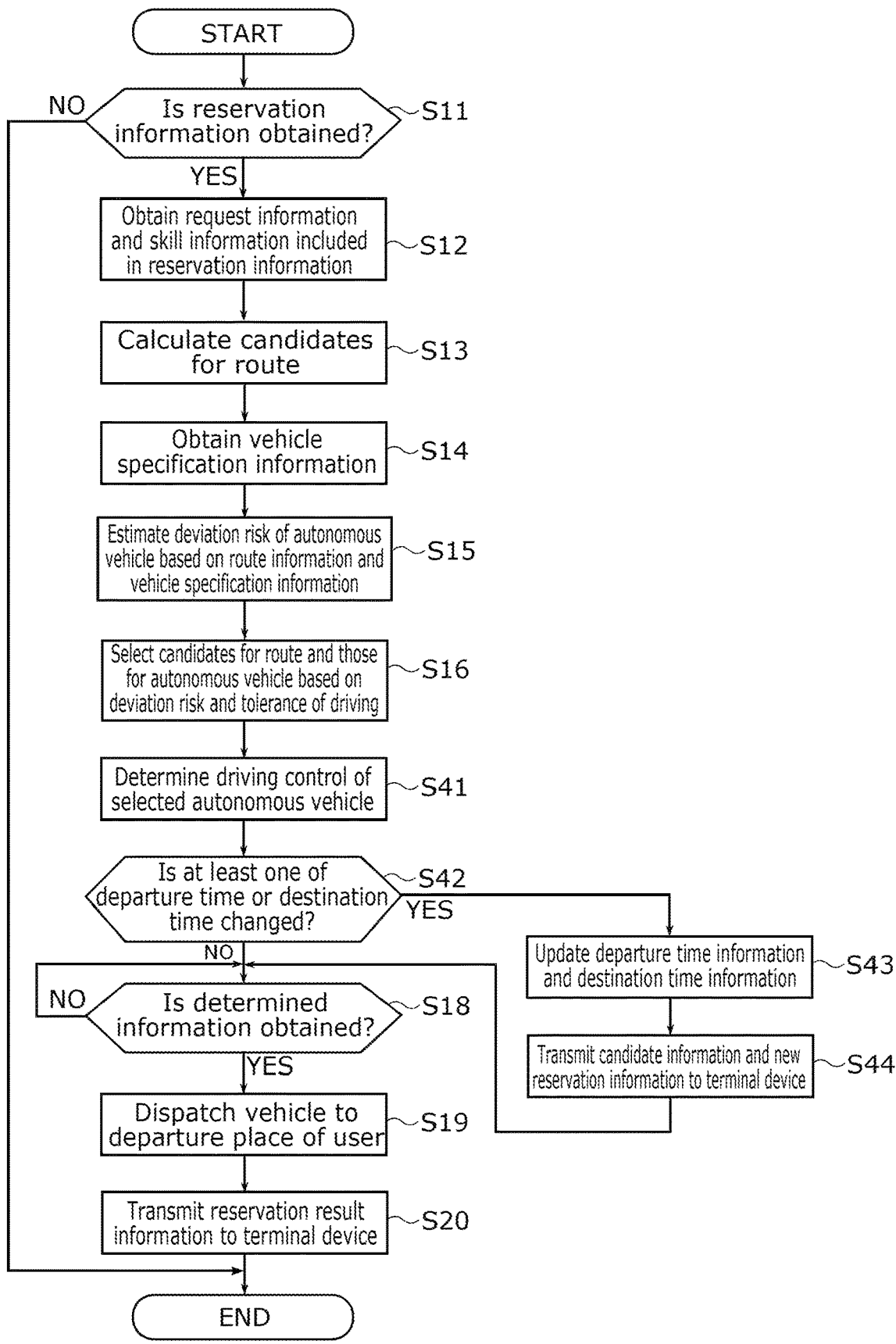
FIG. 6 is a flowchart illustrating an operation of the information processing system according to Embodiment 4.

FIG. 6 is a flowchart illustrating an operation of information processing system 1 according to Embodiment 4.

Identical reference numerals will be given to the processings identical to those in FIG. 2, and the descriptions thereof will be appropriately omitted.

After the processings in steps S11 to S16 are performed in the processing of information processing system 1, matcher 26 determines the driving plans for driving of the selected autonomous vehicles 5, according to the deviation risks with respect to the specifications of the selected one or more autonomous vehicles 5 and the route (S41). In other words, according to the deviation risks, matcher 26 determines the information indicating the driving control of the speed, the acceleration, the deceleration, the steering angle, and the like of autonomous vehicle 5 on the route.

According to the determined driving plan, matcher 26 determines whether to change at least one of the departure time or the arrival time (S42).

When matcher 26 does not change any of the departure time and the arrival time (NO in S42), the processing goes to step S18 to perform the processing identical to that in FIG. 2.

When matcher 26 changes at least one of the departure time or the arrival time (YES in S42), matcher 26 updates the departure time information and the arrival time information according to the driving plan and the original reservation information (S43).

Matcher 26 transmits the updated reservation information and the candidate information to terminal device 3 through communicator 28 or the like (S44).

Information processing system 1 then goes to step S18 to perform the processing identical to that in FIG. 2.

<Effects of Action>

Next, the effects of action of the information processing method according to the present embodiment and information processing system 1 according to the present embodiment will be described.

As described above, the information processing method according to the present embodiment and information processing system 1 according to the present embodiment can present the driving plan to the user who plans to ride autonomous vehicle 5. For this reason, this user can use the driving plan as a criterion for determining whether the transportation time and the route indicated in the driving plan match the request of the user. For example, when a plurality of driving plans is presented to the user, this user can select a desired driving plan.

The information processing method according to the present embodiment and information processing system 1 according to the present embodiment can also provide the same effects of action as those in Embodiment 1.

Embodiment 5

<Configuration>

The information processing method according to the present embodiment and the configuration of information processing system 1 according to the present embodiment will be described.

Other configurations in the present embodiment are identical to those in Embodiment 1 and the like unless otherwise specified, and identical reference numerals will be given to such identical configurations to omit detailed descriptions thereof.

[Matcher 26]

When one or more autonomous vehicles 5 having not the deviation risk or having the deviation risk lower than the threshold are not selected for the user not having the driving skill or having a driving skill less than the threshold, matcher 26 changes the obtained route to a different route. The different route has a deviation risk lower than the obtained route.

For example, in the case where autonomous vehicle 5 not satisfying the condition is presented to and reserved for the user because one or more autonomous vehicles 5 having not the deviation risk or having a deviation risk lower than the threshold are not selected for the user not having the driving skill or having a driving skill less than the threshold, the user cannot drive autonomous vehicle 5 when autonomous vehicle 5 is switched to the manual driving state on the route. For this reason, there is a possibility that driving of autonomous vehicle 5 may be stopped or cancelled.

Thus, in such a case, matcher 26 changes the route indicated in the route information obtained from route calculator 24 to the different route. In other words, matcher 26 changes the original route to an alternative route which has a reduced deviation risk compared to that of the original route or does not have the deviation risk. Matcher 26 provides the condition of the alternative route to route calculator 24, and causes route calculator 24 to search for the alternative route.

After obtaining the alternative route, matcher 26 generates alternative candidate information, and transmits the generated alternative candidate information to terminal device 3 through communicator 28 or the like. Specifically, matcher 26 reselects candidates for autonomous vehicle 5 according to the deviation risk in the alternative route. The alternative candidate information including the reselected candidates for autonomous vehicle 5 and the reselected candidates for the route is generated.

Moreover, matcher 26 may update the reservation information based on the alternative candidate information. For example, matcher 26 updates the reservation information to the reservation information including the route indicated in the alternative candidate information and the departure time and the arrival time which can be reserved for autonomous vehicle 5. Matcher 26 then transmits the updated reservation information to terminal device 3 through communicator 28.

When one or more autonomous vehicles 5 not having the deviation risk or having a deviation risk lower than the threshold are not selected for the user not having the driving skill or having a driving skill less than the threshold, matcher 26 may send a notification of a suggestion for improving the driving skill of the user. Specifically, in the case where matcher 26 can select the routes and autonomous vehicles 5 listed as candidates as a result of an improvement in driving skill, matcher 26 generates suggestion information indicating the suggestion. The generated suggestion information is transmitted to terminal device 3 through communicator 28. A low driving skill of the user may cause the case where any candidate for autonomous vehicle 5 is not presented to the user. In such cases, the candidate information can be presented to the user or the candidate information to be suggested can be increased by suggesting to the user that the user should take a lesson to improve the driving skill.

<Operation>

The operation of information processing system 1 having such a configuration will be described with reference to FIG. 7.

Figure 7:
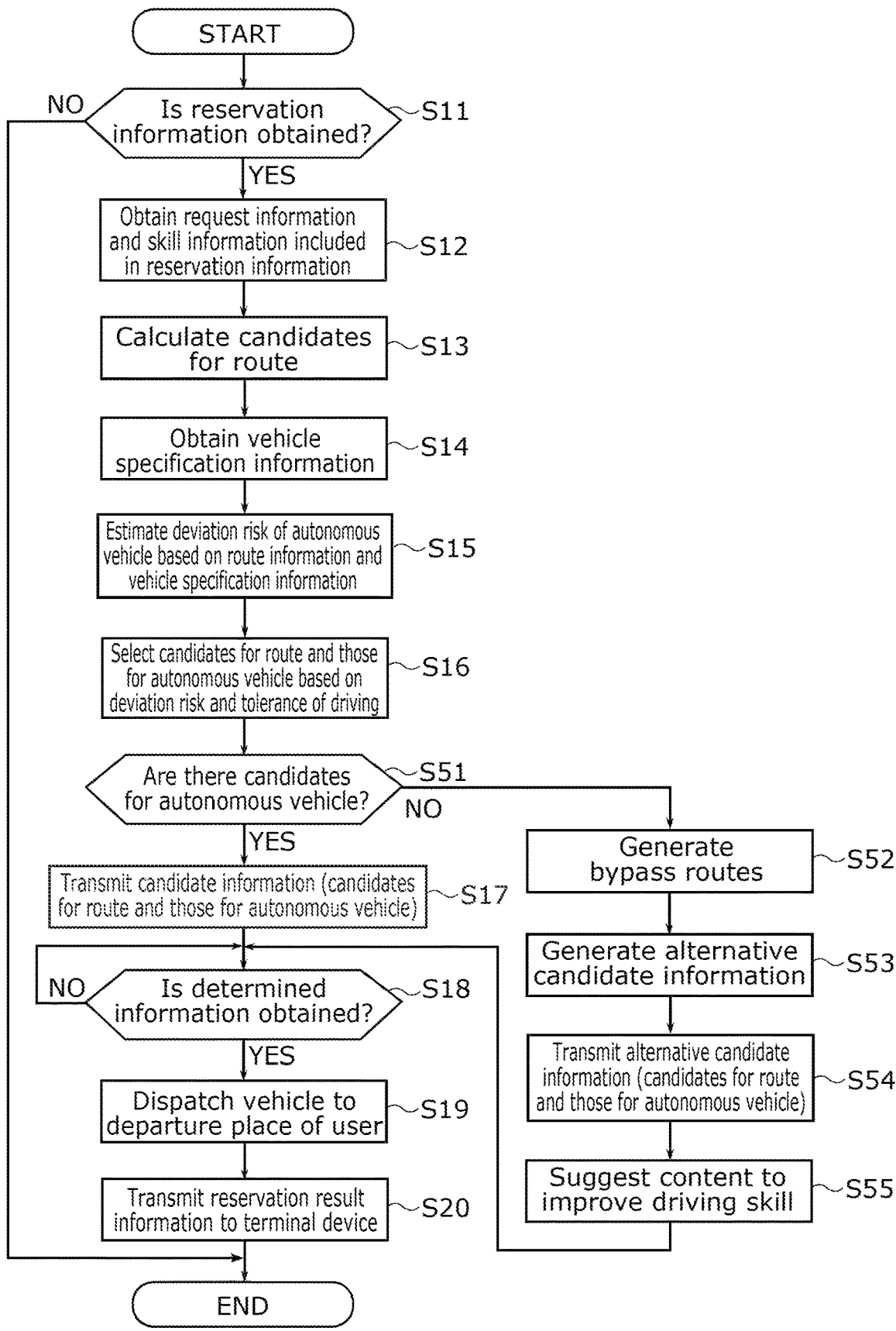
FIG. 7 is a flowchart illustrating an operation of the information processing system according to Embodiment 5.

FIG. 7 is a flowchart illustrating an operation of information processing system 1 according to Embodiment 5.

Identical reference numerals will be given to the processings identical to those in FIG. 2, and the descriptions thereof will be appropriately omitted.

After the processings in steps S11 to S16 are performed in the processing of information processing system 1, matcher 26 determines whether there are one or more candidates for autonomous vehicle 5 (S51).

When one or more candidates for autonomous vehicle 5 are present (YES in S51), the processing goes to step S17 to perform the processing identical to that in FIG. 2.

In contrast, when one or more candidates for autonomous vehicle 5 are not present (NO in S51), matcher 26 causes route calculator 24 to search for an alternative route having a reduced deviation risk compared to that of the original route in step S16 or an alternative route not having the deviation risk (S52).

Matcher 26 generates the alternative candidate information according to the alternative route found through search (S53). Specifically, matcher 26 reselects the candidates for autonomous vehicle 5 according to the deviation risk in the alternative route.

Matcher 26 transmits the generated alternative candidate information to terminal device 3 through communicator 28 (S54).

Matcher 26 also sends a notification of a suggestion for improving the driving skill of the user (S55).

Information processing system 1 then goes to step S18 to perform the processing identical to that in FIG. 2.

<Effects of Action>

Next, the effects of action of the information processing method according to the present embodiment and information processing system 1 according to the present embodiment will be described.

As described above, the information processing method according to the present embodiment and information processing system 1 according to the present embodiment can recommend the user having a low driving skill to improve the driving skill.

Moreover, the information processing method according to the present embodiment and information processing system 1 according to the present embodiment can present a route having a deviation risk lower than the obtained route to a user not having the driving skill or having a low driving skill. For this reason, the autonomous vehicle having a user not having the driving skill or having a low driving skill on board can move without deviating from the ODD.

The information processing method according to the present embodiment and information processing system 1 according to the present embodiment can also provide the same effects of action as those in Embodiment 1.

(Other Modifications)

Although the present disclosure has been described based on Embodiments 1 to 5, Embodiments 1 to 5 should not be construed as limitations to the present disclosure.

For example, the information processing methods and the information processing systems according to Embodiments 1 to 5 may be each implemented by a program using a computer, and such a program may be stored in a memory device.

Moreover, the processors included in the information processing methods and the information processing systems according to Embodiments 1 to 5 are typically implemented as LSIs, which are integrated circuits. These may be individually formed into single chips, or may be partially or completely formed into a single chip.

The formation of the integrated circuit is not limited to LSI, and these integrated circuits may be implemented as dedicated circuits or general-purpose processors. A field programmable gate array (FPGA) programmable after production of the LSI or a reconfigurable processor which allows circuit cells in the LSI to be reconnected and reconfigured may also be used.

In each of Embodiments 1 to 5 above, each of the components may be configured of dedicated hardware, or may be implemented by executing a software program suitable for the component. The components may be implemented by a program executer such as a CPU or a processor which reads out and executes software programs recorded on a recording medium such as a hard disk or a semiconductor memory.

The numeric values used above are all exemplified to specifically describe the present disclosure, and should not be construed as limitations to Embodiments 1 to 5 according to the present disclosure.

The division of the functions into the functional blocks in the block diagram is one example. A plurality of functional blocks may be implemented as one functional block, one functional block may be divided into several functional blocks, or part of the functions may be moved to another functional block. Moreover, in a plurality of functional blocks having similar functions, the functions may be subjected to parallel or time-sharing processing by a single piece of hardware or software.

The order of the steps to be executed in the flowchart is exemplified to specifically describe the present disclosure, and the steps may be executed in any other order. Alternatively, part of the steps may be executed concurrently with another step (in parallel).

Besides, the present disclosure also covers embodiments obtained from a variety of variations of Embodiments 1 to 5 conceived by persons skilled in the art, and embodiments implemented with any combination of the components and functions in Embodiments 1 to 5 without departing from the gist of the present disclosure.

INDUSTRIAL APPLICABILITY

The present disclosure can be used in autonomous vehicles, apparatuses which remotely operate autonomous vehicle, terminal devices which present the states of autonomous vehicles, or systems including these.

The invention claimed is:

1. An information processing method to be executed by a computer, the information processing method comprising:
   obtaining a driving skill of a person who rides an autonomous vehicle, the driving skill representing at least one of whether the person can drive an autonomous vehicle which can be manually driven or a level at which the person can drive;
   obtaining specifications of a plurality of autonomous vehicles about autonomous driving;
   obtaining a route for transporting the person;
   determining deviation risks based on the specifications and the route, each of the deviation risks including at least one of a possibility of deviation of an autonomous driving system including a corresponding one of the plurality of autonomous vehicles from an operational design domain or a degree of the deviation;
   selecting an autonomous vehicle assigned to transportation of the person from the plurality of autonomous vehicles, according to each of the deviation risks and the driving skill; and
   sending a notification of the autonomous vehicle selected, wherein each of the deviation risks is an index indicating a possibility that the autonomous vehicle having the specification, when driving the route, deviates from the operational design domain set to the route.

2. The information processing method according to claim 1, further comprising:
obtaining a tolerance of the person with respect to a request to drive,
wherein the selecting of the autonomous vehicle assigned to transportation of the person also includes selecting the autonomous vehicle assigned to transportation of the person from the plurality of autonomous vehicles, according to the tolerance.

3. The information processing method according to claim 1, further comprising:
obtaining a physical condition of the person,
wherein the selecting of the autonomous vehicle assigned to transportation of the person also includes selecting the autonomous vehicle assigned to transportation of the person from the plurality of autonomous vehicles, according to the physical condition.

4. The information processing method according to claim 1,
wherein when the person has the driving skill or the driving skill of the person is higher than or equal to a threshold, the selecting of the autonomous vehicle assigned to transportation of the person includes selecting a deviation risk-positive autonomous vehicle from the plurality of autonomous vehicles, the deviation risk-positive autonomous vehicle having the deviation risk or having a deviation risk higher than or equal to a threshold.

5. The information processing method according to claim 4,
wherein the deviation risk-positive autonomous vehicle is an autonomous vehicle which has a deviation risk and benefits for the person which are higher than deviation risks and benefits of other autonomous vehicles among the plurality of autonomous vehicles.

6. The information processing method according to claim 1,
wherein when the person does not have the driving skill or the driving skill of the person is lower than the threshold, the selecting of the autonomous vehicle assigned to transportation of the person includes selecting a deviation risk-negative autonomous vehicle from the plurality of autonomous vehicles, the deviation risk-negative autonomous vehicle not having the deviation risk or having a deviation risk lower than a threshold.

7. The information processing method according to claim 6,
wherein the deviation risk-negative autonomous vehicle is an autonomous vehicle which has a deviation risk lower than deviation risks of other autonomous vehicles among the plurality of autonomous vehicles.

8. The information processing method according to claim 6, further comprising:
changing the route obtained to a different route when the deviation risk-negative autonomous vehicle is not selected,
wherein the different route has a deviation risk lower than a deviation risk of the route obtained.

9. The information processing method according to claim 6, further comprising:
sending a notification of a suggestion for improving the driving skill of the person when the deviation risk-negative autonomous vehicle is not selected.

10. The information processing method according to claim 1, further comprising:
calculating a monitoring resource for monitoring the autonomous vehicle selected, according to the deviation risk of the autonomous vehicle selected and the driving skill;
calculating a cost for transportation of the person by the autonomous vehicle selected, according to the monitoring resource calculated, a specification of the autonomous vehicle selected, and the route; and
sending a notification of the cost calculated.

11. The information processing method according to claim 1, further comprising:
calculating a stop risk according to the specification of the autonomous vehicle selected and the deviation risk with respect to the route, the stop risk indicating a possibility that the autonomous vehicle selected may stop on the route; and
sending a notification of the stop risk calculated.

12. The information processing method according to claim 1, further comprising:
determining driving control of the autonomous vehicle selected, according to the specification of the autonomous vehicle selected and the deviation risk with respect to the route;
generating a driving plan based on the driving control determined; and
sending a notification of the driving plan generated.

13. An information processing system, comprising:
a driving skill obtainer which obtains a driving skill of a person who rides an autonomous vehicle, the driving skill representing at least one of whether the person can drive an autonomous vehicle which can be manually driven or a level at which the person can drive;
a specification obtainer which obtains specifications of a plurality of autonomous vehicles about autonomous driving;
a route calculator which calculates a route for transporting the person;
a risk determiner which determines deviation risks based on the specifications obtained by the specification obtainer and the route calculated by the route calculator, each of the deviation risks including at least one of a possibility of deviation of an autonomous driving system including a corresponding one of the plurality of autonomous vehicles from an operational design domain or a degree of the deviation;
a selector which selects an autonomous vehicle assigned to transportation of the person from the plurality of autonomous vehicles, according to each of the deviation risks determined by the risk determiner and the driving skill obtained by the driving skill obtainer; and
an outputter which sends a notification of the autonomous vehicle selected by the selector,
wherein each of the deviation risks is an index indicating a possibility that the autonomous vehicle having the specification, when driving the route, deviates from the operational design domain set to the route.

* * * * *